United States Patent
Yu

(10) Patent No.: US 9,041,552 B2
(45) Date of Patent: May 26, 2015

(54) AUTOMOBILE BLIND SPOT DETECTION SYSTEM AND METHOD

(75) Inventor: Xiao Lin Yu, Fairfax, VA (US)

(73) Assignee: Xiao Lin Yu, Fairfax, VA (US)

( * ) Notice: Subject to any disclaimer, the term of this patent is extended or adjusted under 35 U.S.C. 154(b) by 554 days.

(21) Appl. No.: 13/346,783

(22) Filed: Jan. 10, 2012

(65) Prior Publication Data

US 2013/0176145 A1 Jul. 11, 2013

(51) Int. Cl.
*G08G 1/09* (2006.01)
*G08G 1/16* (2006.01)

(52) U.S. Cl.
CPC ............... *G08G 1/167* (2013.01); *G08G 1/162* (2013.01)

(58) Field of Classification Search
CPC ......... G08G 1/00; G08G 1/123; G08G 1/161; G08G 1/09; G01C 21/00; G01S 7/58; G01S 15/931; B60Q 1/525; B60Q 9/008; B60R 21/0134; Y10S 367/909
USPC .............. 340/902, 903, 905, 435, 435.5, 436; 340/425.5; 381/307; 348/118, 837; 701/32.2, 301
See application file for complete search history.

(56) References Cited

U.S. PATENT DOCUMENTS

| | | | | |
|---|---|---|---|---|
| 5,235,316 A * | 8/1993 | Qualizza | .................... | 340/436 |
| 6,031,449 A * | 2/2000 | Laporte et al. | ................ | 340/436 |
| 6,198,409 B1 * | 3/2001 | Schofield et al. | ............. | 340/903 |
| 6,753,766 B2 * | 6/2004 | Patchell | .................... | 340/436 |
| 6,927,677 B2 * | 8/2005 | Anderson et al. | ............. | 340/435 |
| 7,377,675 B2 * | 5/2008 | Pastrick et al. | ................ | 362/494 |
| 7,706,963 B2 * | 4/2010 | Parikh et al. | .................... | 701/117 |
| 8,066,415 B2 * | 11/2011 | Pastrick et al. | ................ | 362/494 |
| 8,493,195 B2 * | 7/2013 | Lee | .................... | 340/435 |
| 8,764,256 B2 * | 7/2014 | Foote et al. | .................... | 362/494 |
| 2002/0011926 A1 * | 1/2002 | King | .................... | 340/436 |
| 2002/0105418 A1 * | 8/2002 | Yurimoto et al. | ............. | 340/436 |
| 2002/0175852 A1 * | 11/2002 | Zoratti et al. | .................... | 342/70 |
| 2003/0052773 A1 * | 3/2003 | Sjonell | .................... | 340/435 |
| 2005/0111117 A1 * | 5/2005 | Qualich et al. | ................ | 359/843 |
| 2005/0243568 A1 * | 11/2005 | Rodriguez Barros et al. | ............................. | 362/494 |
| 2006/0006988 A1 * | 1/2006 | Harter et al. | .................... | 340/435 |
| 2006/0091653 A1 * | 5/2006 | De Mersseman et al. | ..... | 280/735 |
| 2006/0290482 A1 * | 12/2006 | Matsumoto et al. | .......... | 340/436 |
| 2007/0018800 A1 * | 1/2007 | Boss et al. | .................... | 340/435 |
| 2007/0152152 A1 * | 7/2007 | Deasy et al. | ................ | 250/338.1 |
| 2007/0152803 A1 * | 7/2007 | Huang et al. | .................... | 340/435 |
| 2007/0279199 A1 * | 12/2007 | Danz et al. | .................... | 340/435 |
| 2008/0169938 A1 * | 7/2008 | Madau | .................... | 340/901 |
| 2009/0243822 A1 * | 10/2009 | Hinninger et al. | ............ | 340/435 |
| 2009/0290369 A1 * | 11/2009 | Schofield et al. | ............. | 362/494 |
| 2011/0140917 A1 * | 6/2011 | Lynam et al. | ................ | 340/905 |
| 2011/0210842 A1 * | 9/2011 | Mandagaran | ................ | 340/461 |

(Continued)

*Primary Examiner* — Benjamin Lee
*Assistant Examiner* — Quang D Pham
(74) *Attorney, Agent, or Firm* — Anova Law Group, PLLC

(57) ABSTRACT

A system is provided for detecting a blind spot for a driver of a vehicle. The system includes a side mirror. The side mirror is arranged on a body of the vehicle and includes a side mirror body, a mirror, and a supporting structure. The system also includes a detection system. The detection system is physically coupled with the side mirror to detect an object in a detection zone of the detection system. The detection zone covers the blind spot, and the detection system includes a detection module, an alert indicator, and a control module. The detection module includes at least one of a transmitter and a receiver, and the alert indicator is configured to send an alert light to the driver at a predetermined angle such that the alert light does not interfere with drivers of other vehicles close to the vehicle.

16 Claims, 13 Drawing Sheets

(56) References Cited

U.S. PATENT DOCUMENTS

| | | | |
|---|---|---|---|
| 2011/0221588 A1* | 9/2011 | Foote et al. | 340/465 |
| 2011/0260845 A1* | 10/2011 | Henion et al. | 340/435 |
| 2012/0075879 A1* | 3/2012 | Uematsu et al. | 362/540 |
| 2012/0081915 A1* | 4/2012 | Foote et al. | 362/494 |
| 2014/0015975 A1* | 1/2014 | Pastrick et al. | 348/148 |
| 2014/0077939 A1* | 3/2014 | Hong et al. | 340/435 |
| 2014/0078306 A1* | 3/2014 | Miyoshi et al. | 348/148 |
| 2014/0092249 A1* | 4/2014 | Freiburger | 348/148 |
| 2014/0114500 A1* | 4/2014 | Noh | 701/2 |
| 2014/0118130 A1* | 5/2014 | Chang et al. | 340/435 |
| 2014/0159885 A1* | 6/2014 | Chang et al. | 340/435 |
| 2014/0176715 A1* | 6/2014 | Pastrick et al. | 348/148 |
| 2014/0185311 A1* | 7/2014 | Sharghi | 362/520 |

* cited by examiner

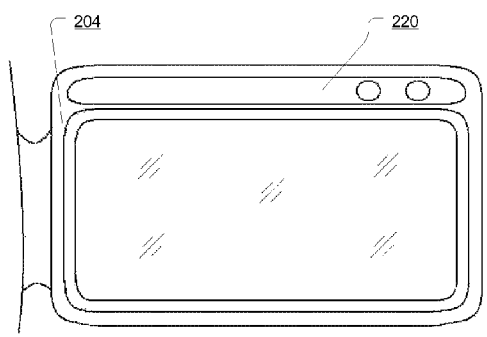
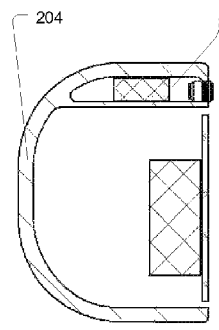
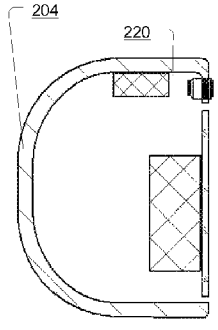
FIG. 15A  FIG. 15B  FIG. 15C
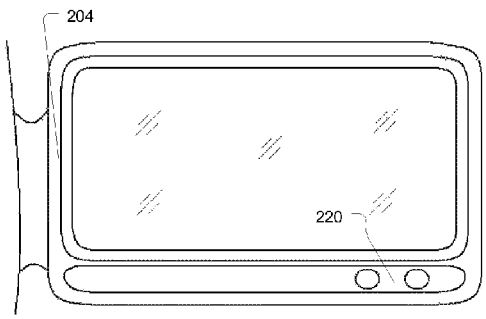
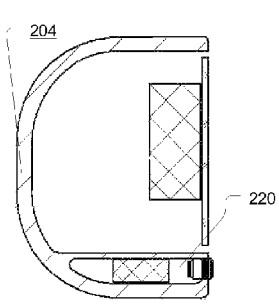
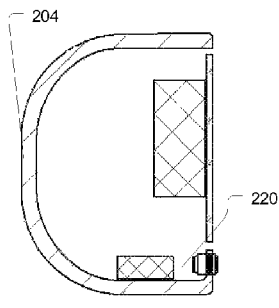
FIG. 16A  FIG. 16B  FIG. 16C
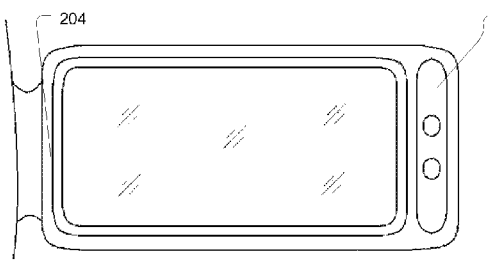
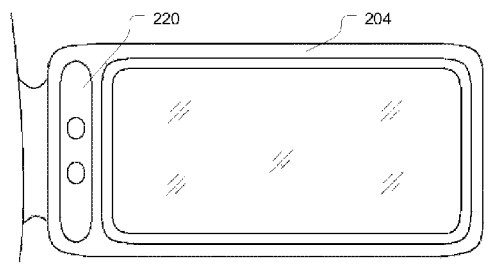
FIG. 17A  FIG. 17B

AUTOMOBILE BLIND SPOT DETECTION SYSTEM AND METHOD

FIELD OF THE INVENTION

This application generally relates to sensing and detection technologies and, more particularly, to systems and methods for detecting automobile blind spots.

BACKGROUND

When turning or changing lanes, a driver of a moving vehicle often needs to look both the front and the back of the vehicle at the same time. It may be easy for the driver to overlook certain places such as blind spots. If there are other vehicles in blind spots of the moving vehicle, it could add danger to the driver. Therefore, in recent years, detecting other vehicles in the blind spots of a moving vehicle has been a research hotspot. Some techniques use parking radar installed at the side or top of a vehicle to perform the detection, while some other techniques use an on-vehicle camera to capture images of the blind spot and to display the images on a screen, and so on. These techniques may have significant limitations. For example, the driver may be required to watch the display screen when turning or changing lanes, which often does not fit the driver's usual driving habits. Therefore, there is a need for new systems and methods for detecting objects in the blind spots of a moving vehicle.

The disclosed methods and systems are directed to solve one or more problems set forth above and other problems.

BRIEF SUMMARY OF THE DISCLOSURE

One aspect of the present disclosure includes a system for detecting a blind spot for a driver of a vehicle. The system includes a side mirror. The side mirror is arranged on a body of the vehicle and includes a side mirror body, a mirror, and a supporting structure. The system also includes a detection system. The detection system is physically coupled with the side mirror to detect an object in a detection zone of the detection system. The detection zone covers the blind spot, and the detection system includes a detection module, an alert indicator, and a control module. The detection module includes at least one of a transmitter and a receiver; and the alert indicator is configured to send an alert light to the driver at a predetermined angle such that the alert light does not interfere with drivers of other vehicles close to the vehicle.

Other aspects of the present disclosure can be understood by those skilled in the art in light of the description, the claims, and the drawings of the present disclosure.

BRIEF DESCRIPTION OF THE DRAWINGS

FIGS. 15A-15C illustrate exemplary arrangements of a detection system and a side mirror consistent with the disclosed embodiments;

FIGS. 16A-16C illustrate exemplary arrangements of a detection system and a side mirror consistent with the disclosed embodiments; and FIGS. 17A-17B illustrate exemplary arrangements of a detection system and a side mirror consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figures 1A, 1B, 1C:
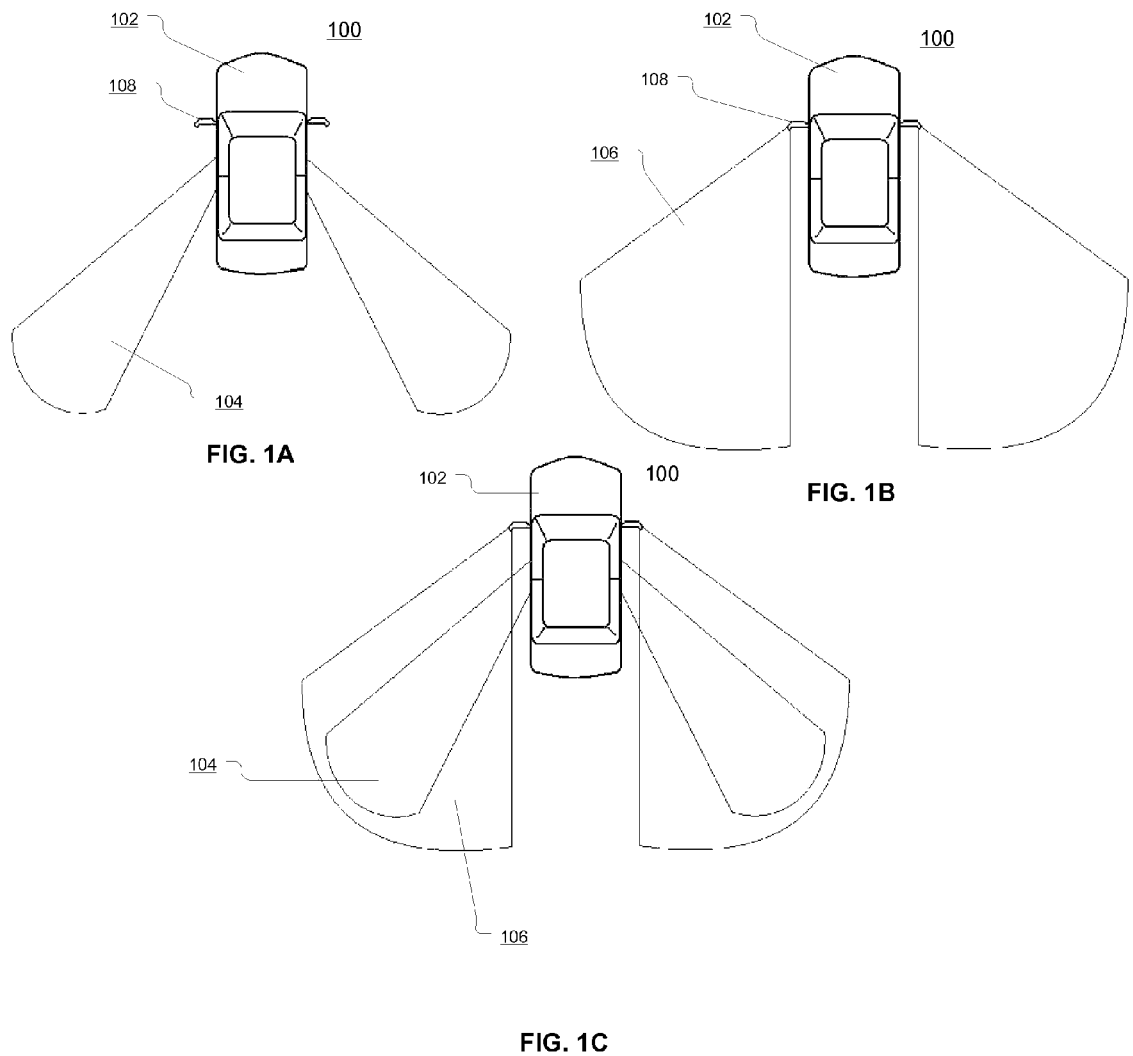
FIGS. 1A-1C illustrate an exemplary environment 100 incorporating certain aspects of the disclosed embodiments.

FIGS. 1A-1C illustrate an exemplary environment 100 incorporating certain aspects of the disclosed embodiments. As shown in FIG. 1A, a general vehicle 102 is equipped with a side mirror 108 at each side. Due to different vehicle shapes and sizes, side mirror design, and driver sitting positions, a driver of vehicle 102 may have a blind spot 104 on each side. A blind spot, as used herein, may refer to one or more places around the vehicle that cannot be viewed by the driver in an ordinary driving position. In order to view these areas, it may be necessary for the driver to physically turn and move one's head to look at those areas. Because of the physical efforts involved, many drivers do not accomplish thorough checks of their blind spots before executing a turn or lane change, which may cause hazardous conditions for both the driver and other vehicles in the blind spots.

As shown in FIG. 1B, a blind spot detection system is physically coupled with (e.g., integrated with) side mirror 108, and the blind spot detection system may be able to detect any moving object within a detection zone 106 on each side of vehicle 102. Further, as shown in FIG. 1C, the detection zone 106 is large enough and schematically positioned to cover blind spot 104 to ensure accurate detection of objects in the blind spot 104.

Figure 2:
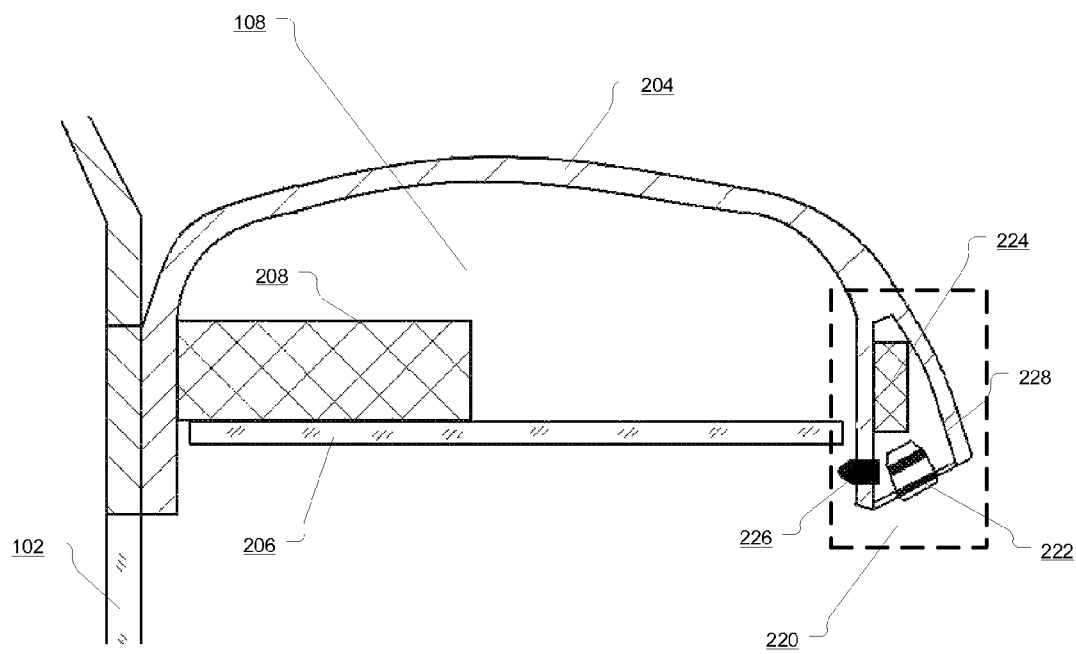
FIG. 2 illustrate an exemplary side mirror integrated with a blind spot detection system consistent with the disclosed embodiments.

FIG. 2 illustrates an exemplary side mirror integrated with a blind spot detection system consistent with the disclosed embodiments. As shown in FIG. 2, a side mirror 108 is attached to a vehicle 102. Side mirror 108 may include any appropriate type of manual or automatic side mirror used in automobiles. Further, side mirror 108 may include a mirror structure 204, a mirror 206, a mirror control 208, and a blind spot detection system 220. Other components may also be included. Although FIG. 2 shows a right side mirror, a left side mirror, or a rear-view mirror may be similarly provided.

Mirror 206 may include any appropriate mirror for the driver to view side and rear directions of the vehicle, such as a glass mirror or other type of mirror. Mirror control 208 may include any appropriate structure(s) for supporting the mirror 206 and for controlling orientations and reflection directions of mirror 206. Further, blind spot detection system 220 is provided to detect objects in a blind spot of side mirror 108 equipped on vehicle 102. Blind spot detection system 220 may include a detection module 222, a control module 224, an alert indicator 226, and a housing 228. Other devices may also be included.

Detection module 222 may include any appropriate sensing devices for detecting the presence of objects, such as a vehicle or a motorcycle, within a given distance and spatial location based on any appropriate technologies, such as ultrasound or infrared technologies. For example, detection module 222 may include various probes, sensors, detectors, and/or other devices. Control module 224 may include any appropriate processor and circuitry to operate and control blind spot detection system 220. Further, alert indicator 226 may include any appropriate alert indicating mechanism to alert the driver of any object detected inside the blind spot.

Housing 228 may be structure to install and secure the above various components of blind spot detection system 220, and may be made from any appropriate materials, such as metal (e.g., stainless steel), plastic, rubber, silicone, organic materials, and/or other suitable materials. Further, housing 228 may be incorporated into side mirror 108 as a part of side mirror 108 or may be integrated with side mirror 108 to be a part of side mirror 108. Housing 228 may also be attached to side mirror 108 as a separate part. Further, housing 228 may be located at the outer side of side mirror 108 such that the detection module 222 may be placed at a desired location (e.g., at front part and the most outer part of the vehicle 102) to have a desired detection view of the blind spot. Other locations may also be used.

Figure 3:
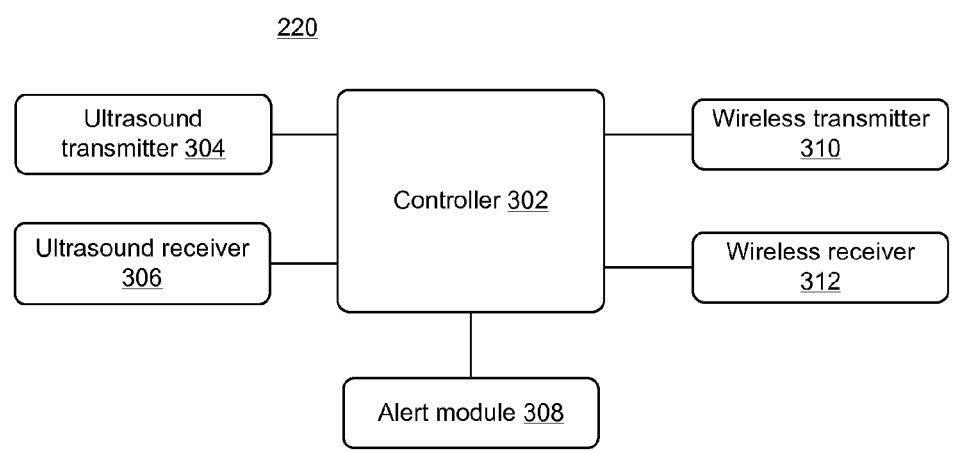
FIG. 3 illustrates an exemplary functional block diagram of blind spot detection system consistent with the disclosed embodiments.

FIG. 3 illustrates an exemplary functional block diagram of blind spot detection system 220 consistent with the disclosed embodiments. As shown in FIG. 3, blind spot detection system 220 may include a controller 302, an ultrasound transmitter 304, an ultrasound receiver 306, an alert module 308, a wireless transmitter 310, and a wireless receiver 312. Other components may be included and certain components may be omitted.

Controller 302 may include any appropriate type of general purpose microprocessor, digital signal processor or microcontroller, and application specific integrated circuit (ASIC). Controller 302 may also include other units such as random access memory (RAM), read-only memory (ROM), a communication interface, an input/output interface, and driving circuitry, etc., for proper operation. For example, controller 302 may execute sequences of computer program instructions to perform various processes associated with blind spot detection system 220. Controller 302 may an independent module within blind spot detection system 220, or may be coincide with any on-board processors or controllers of vehicle 102.

Figure 4:
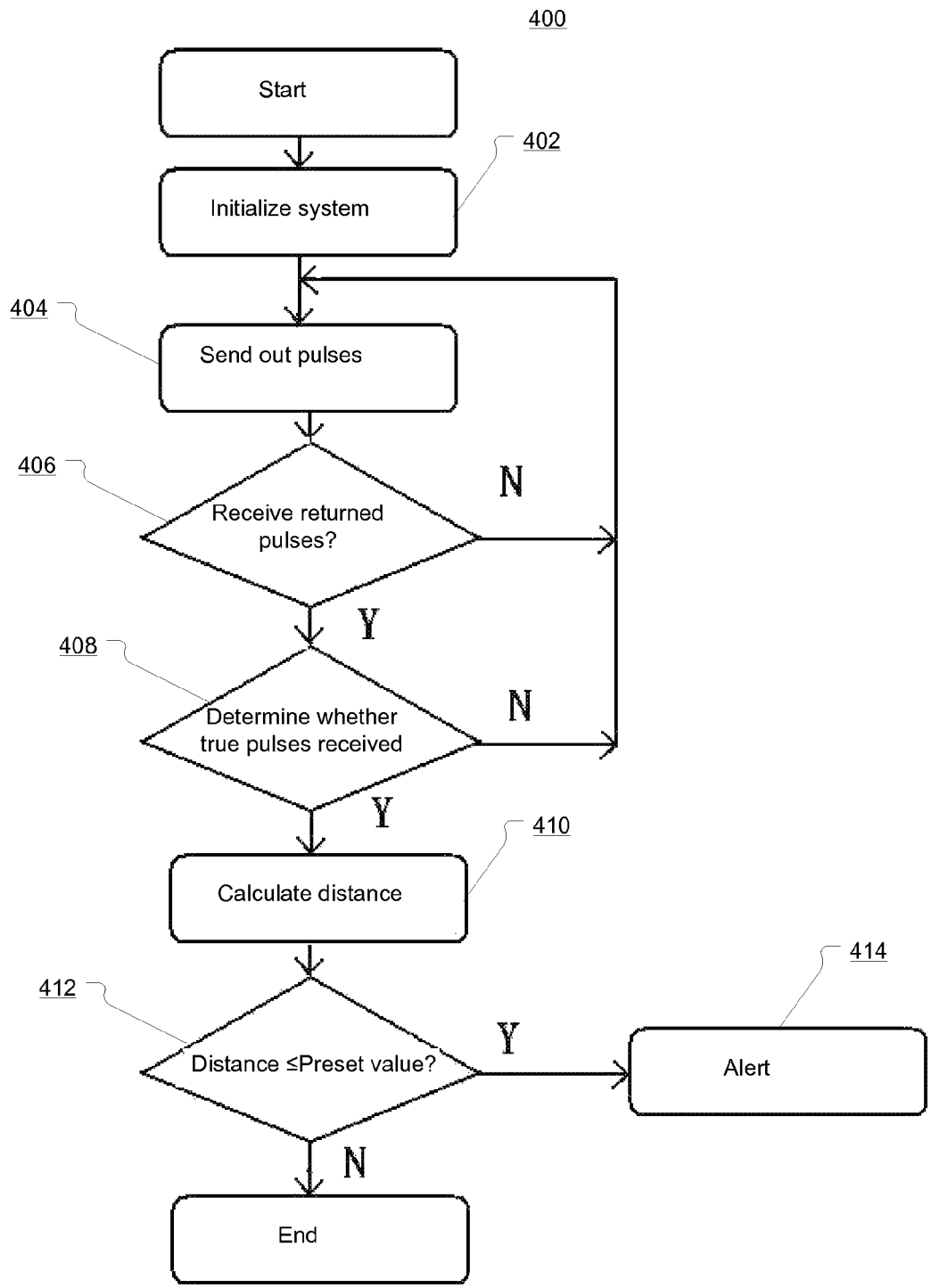
FIG. 4 illustrate an exemplary detecting process consistent with the disclosed embodiments.

Ultrasound transmitter 304 and ultrasound receiver 306 may include any appropriate devices for transmitting and receiving ultrasound signals, respectively. Ultrasound transmitter 304 and ultrasound receiver 306 may be incorporated into detection module 222 to detect the blind spot using ultrasound signals. FIG. 4 illustrates an exemplary process 400 for detecting the blind spot using ultrasound signals.

As shown in FIG. 4, detection system 220 (e.g., controller 302) may first initialize the system including, for example, self-testing, calibrating, and/or performing other start up processing (402). Detection system 220 may send out ultrasound pulses to detect an object within a detection zone covering the blind spot of the vehicle containing detection system 220 (404). Any appropriate ultrasound technology may be used, and the ultrasound transmitter 304 may be used to send the pulses. If there is any object in the detection zone, certain pulses sent out by detection system 220 may be reflected back from that object, and detection system 220 may wait for receiving any returned or reflected-back ultrasound pulses.

Further, detection system 220 may determine whether any returned ultrasound pulses are received (406). If detection system 220 determines that no pulse is returned or received (406; No), detection system 220 may go back to 404 to continue sending out ultrasound pulses. On the other hand, if detection system 220 determines that certain returned pulse or pulses are received (406; Yes), detection system 220 may further determine whether the pulses received are true pulses (i.e., previously transmitted ultrasound pulses reflected back from the object) (408). If detection system 220 determines that the received pulses are not true pulses (408; No), detection system 220 may also go back to 404 to continue sending out ultrasound pulses.

On the other hand, if detection system 220 determines that the received pulses are true pulses (408; Yes), detection system 220 may calculate a distance between detection system 220 and the reflecting object based on the received pulses (410). Any appropriate predetermined algorithms may be used to calculate the distance. Further, detection system 220 may determine whether the calculated distance is less than a preset value (412). The preset value may indicate a threshold of the distance or closeness between the vehicle and the reflecting object within the detection zone. This value may be set by the driver, automatically set to a default value stored in detection system 220, or configured by an on-board computer in the vehicle.

If detection system 220 determines that the calculated distance is less than the preset value (412; Yes), i.e., the reflecting object may be too close to the vehicle to be visible to the driver, detection system 220 may alert the driver by any appropriate means (414). On the other hand, if detection system 220 determines that the calculated distance is not less than the preset value (412; No), detection system 220 may complete the detection process 400.

Figure 5:
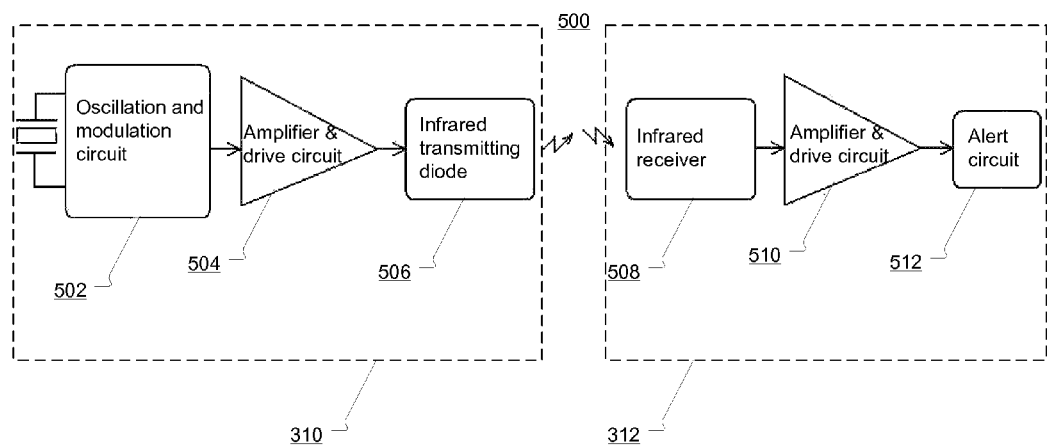
FIG. 5 illustrates an exemplary a simplified infrared based detection system consistent with the disclosed embodiments.

Returning to FIG. 3, alternatively and/or additionally, other wireless detection modules, such as wireless transmitter 310 and wireless receiver 312 may be used to detect the blind spot independently or together with the ultrasound transmitter 304 and ultrasound receiver 306. Wireless transmitter 310 and wireless receiver 312 may use any appropriate wireless signals, such as radio signals, infrared signals, electro-magnetic fields, etc. FIG. 5 shows a simplified infrared based detection system 500 consistent with the disclosed embodiments.

As shown in FIG. 5, infrared detection system 500 may include an oscillation and modulation circuit 502, an amplifier and drive circuit 504, an infrared transmitting diode 506, an infrared receiver 508, an amplifier and drive circuit 510, and an alert circuit 512. Oscillation and modulation circuit 502, amplifier and drive circuit 504, and infrared transmitting diode 506 may be included in wireless transmitter 310, and infrared receiver 508, amplifier and drive circuit 510, and alert circuit 512 may be include in wireless receiver 312. Other devices may also be included.

Oscillation and modulation circuit 502 may be used to create a detection signal. The detection signals may include both passive signals and active signals. A passive signal may refer to a signal that is used for passive detection based on the assumption that the object reflects back the detection signal; while an active signal may refer to a signal that is used for communication with other vehicles to notify the existence of a blind spot situation.

Further, amplifier and drive circuit 504 may include any appropriate circuitry to process the created detection signal such that the processed detection signal can be sent out by infrared transmitting diode 506. On the receiving side, infrared receiver 508 may be used to receive any incoming infrared signals, whether reflecting signals or communication signals, and amplifier and drive circuit 510 may be used to process the received infrared signals. In certain embodiments, amplifier and drive circuit 510 may be coincide with amplifier and drive circuit 504. Further, alert circuit 512 may be coupled to alert module 308 to generate alerts for the driver if an object in the blind spot is indicated by the received infrared signals, or alert circuit 512 may be considered as part of alert module 308 to independently generate the alerts to the driver.

For example, the infrared transmitter may transmit into surrounding space infrared signals at a certain strength. The infrared signals are intended to be received by other vehicles in the sounding space and to notify the other vehicles that the vehicle might be blind spots of the other vehicles. Further, the infrared detector or receiver may be mounted on a rear-view mirror to detect whether there are infrared signals transmitted from other vehicles within the detection zone, which covers the blind spot of the vehicle. When the infrared signals transmitted from other vehicles are detected, the detection system alerts the driver of the vehicle.

Although infrared signals are used as examples, the detection signals can include infrared signals, optical signals, wireless signals, and other types of signals. In certain embodiments, the detection system (e.g., the infrared transmitter) may load digital information about the vehicle including orientation coordinates, speed, driving direction, and vehicle identification number onto the detection signals to be transmitted into the surrounding space and to be received by other vehicles in the surrounding space.

Figures 6A, 6B:
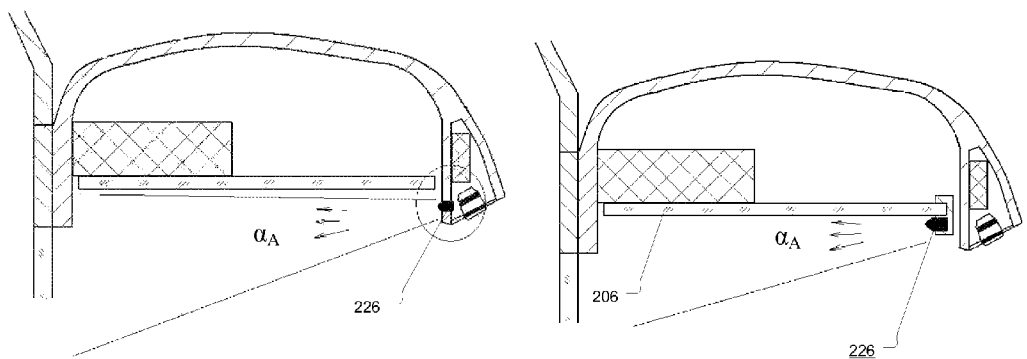
FIGS. 6A-6B illustrates exemplary alert indicator configurations consistent with the disclosed embodiments.

Returning to FIG. 3, alert module 308 may include any appropriate circuitry and devices to alert the driver of any object in the blind spot of the vehicle. For example, alert module 308 may include alert indicator 226 for emitting an alerting light (e.g., a red light or an orange light) to the driver. Further, alert indicator 226 may be configured in such a way that only the driver of the vehicle can see the alerting light and drivers of other vehicles cannot see the alerting light so as to avoid interference or confusing for the other drivers (e.g., turning light, etc.). As shown in FIG. 6A, a transmitting angle $\alpha_A$ may be configured for the alert indicator 226 to limit the alerting light from the alert indicator 226 to only the driver of the vehicle. The transmitting angle $\alpha_A$ may be achieved by configuring the alerting indicator 226 or by using an external mechanical structure to limit the alerting lights to the transmitting angle $\alpha_A$. Other configurations may also be used. FIG. 6B shows an alternative configuration of alert indicator 226. As shown in FIG. 6B, alert indicator 226 is mounted on an outer side of the mirror 206 to similarly achieve the transmitting angle $\alpha_A$.

Figure 7:
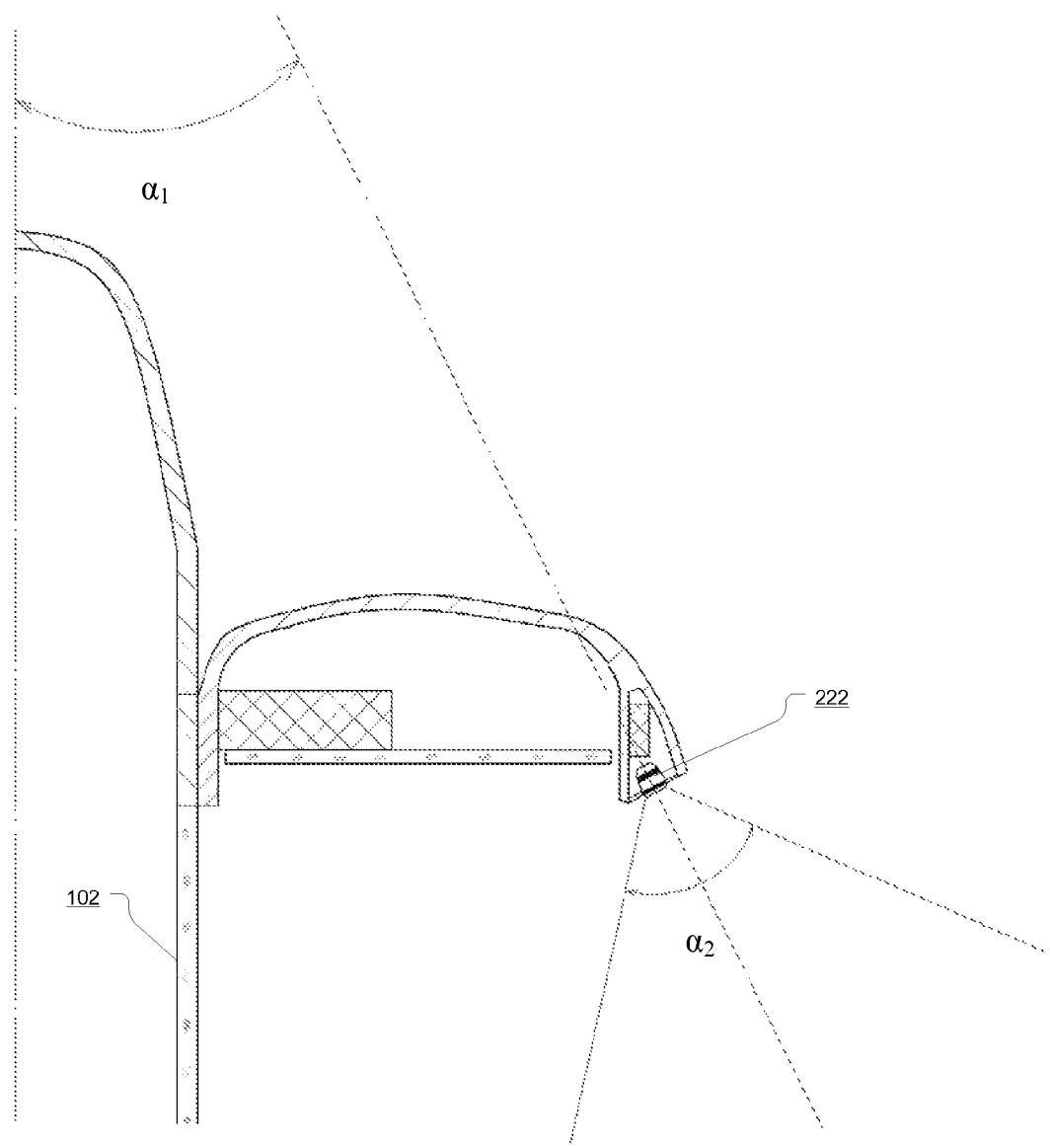
FIG. 7 illustrates an exemplary detection zone configuration consistent with the disclosed embodiments.

Returning to FIG. 2, as previously explained, detection system 220 may be used to detect any object in a detection zone, which covers the blind spot. Because the detection zone in general is larger than the blind spot, it is possible that the driver may still be able to see the object when the alert indicator 226 is indicating an alert situation. This may be desired in that the driver is put on alert and can easily tell whether there is any real danger if the driver wants to turn or change lanes. The detection zone may be configured as so to achieve a desired balance between real alerts and pseudo alerts (i.e., alerts for those objects still visible to the driver). FIG. 7 shows an exemplary detection zone configuration consistent with the disclosed embodiments.

As shown in FIG. 7, detection module 222 or a detector of detection module 222 may be configured to have an angle $\alpha_1$ with a centerline of the vehicle 102. The angle $\alpha_1$ be referred as a first desired detection angle so as to avoid detection interference from the vehicle itself, such as reflecting detection signals, etc. Further, to adjust desired blind spot coverage, detection module 222 or a detector of detection module 222 may be configured to have an angle $\alpha_2$ for transmitting detection signals. The transmitting angle $\alpha_2$ be referred as a second desired detection angle so as to determine a size of the detection zone together with the angle $\alpha_1$.

Figure 8:
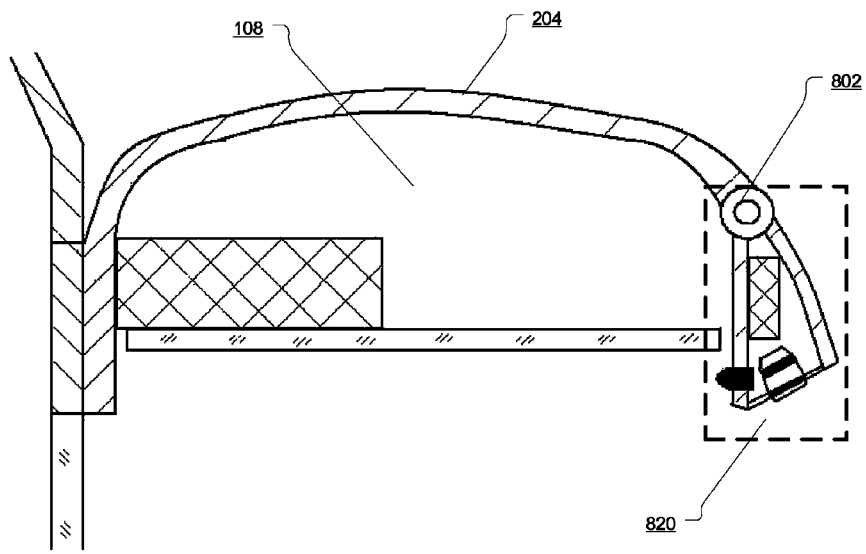
FIG. 8 illustrates another exemplary detection system configuration consistent with the disclosed embodiments.
Figure 9:
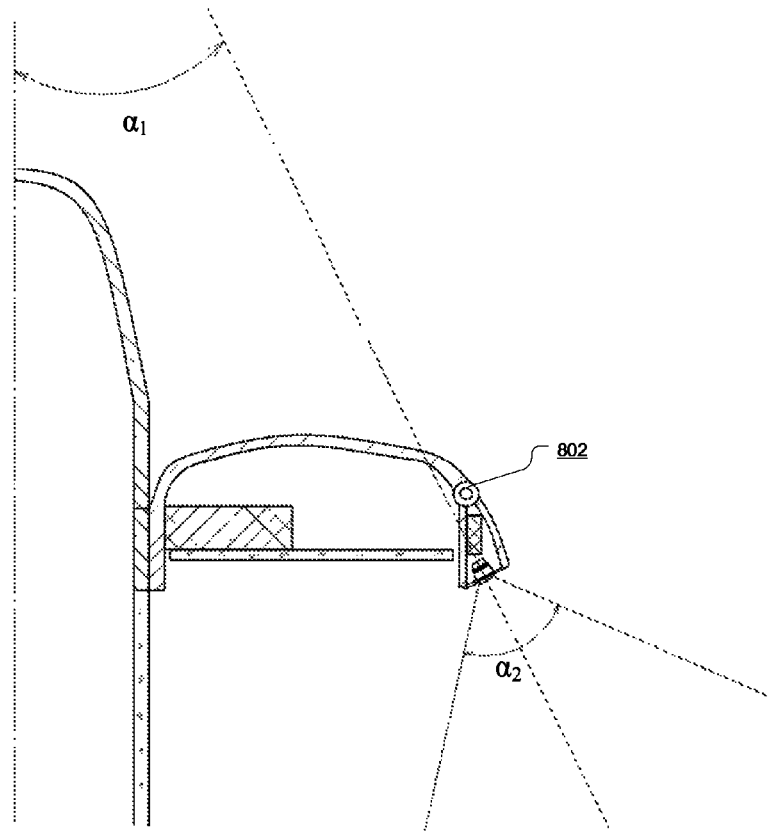
FIG. 9 illustrates another exemplary detection zone configuration consistent with the disclosed embodiments.

FIG. 8 shows another exemplary configuration of detection system 820. As shown in FIG. 8, detection system 820 may be integrated with mirror 204 through rotating structure 802. That is, the difference between detection system 820 and detection system 220 as in FIG. 2 may be that the detection system 820 includes the rotating structure 802. Otherwise, in the present disclosure, the detection system 220 and the detection system 820 may be used interchangeably. Further, rotating structure 802 may include any appropriate structure, such as a pivot, such that detection system 820 may be adjusted when integrated with mirror 204. By adjusting the rotating structure 802, the detection zone of detection system 820 may be adjusted during operation manually and/or automatically. For example, as shown in FIG. 9, the first desired detection angle $\alpha_1$ may be adjusted by adjusting the rotating structure 802, while keeping the same second desired detection angle $\alpha_2$.

Figure 10A:
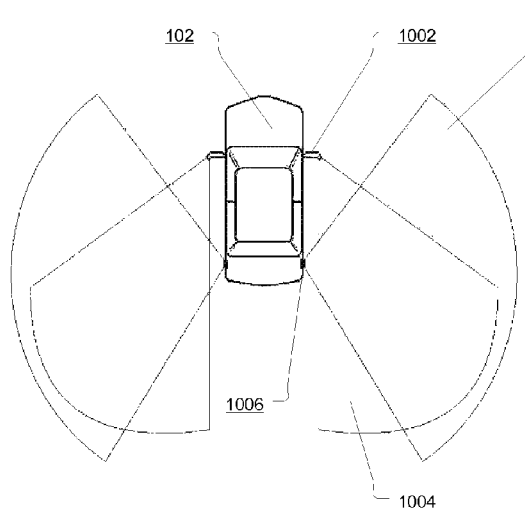
FIGS. 10A-10B illustrate an exemplary combined detection system consistent with the disclosed embodiments.
Figure 10B:
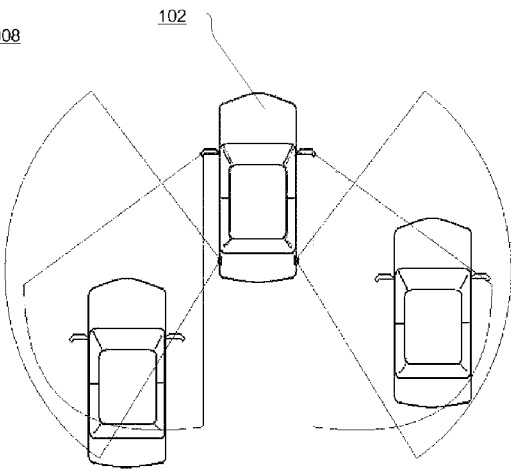

Further, more than one detection system may be used. In addition to detection system 220 (or detection system 820) integrated with mirror 204, extra detection system 220 may also be mounted on other parts of the vehicle to form a combined detection system. FIGS. 10A and 10B illustrate such as combined system consistent with the disclosed embodiments.

As shown in FIG. 10A, vehicle 102 may include a primary detection system 1002 having a first detection zone 1004 and a secondary detection system 1006 having a second detection zone 1008. Any appropriate number of detection systems and detection zones may be included.

Primary detection system 1002 (e.g., detection system 220) may be provided as the main detection system for detecting any object in the blind spot and for alerting the driver of the detected object. Primary detection system 1002 may be integrated with side mirrors of vehicle 102. On the other hand, secondary detection system 1006 may be a simplified detection system 220 including part or all of the functionalities of detection system 220. Secondary detection system 1006 may be placed on the side or rear end of the vehicle 102 and may support the primary detection system 1002 to provide more accurate detections.

For example, in one embodiment, secondary detection system 1006 may only include an ultrasound or wireless transmitter without receivers. The additional signal transmitted from the secondary detection system 1006 may be received by primary detection system 1002 as an additional reference signal from a different location to provide more accurate calculation about the location and distance of any object in both the detection zone 1004 and the detection zone 1008. That is, a new detection zone may be defined based the detection zone 1004 and the detection zone 1008.

In another embodiment, secondary detection system 1006 may only include an ultrasound or wireless receiver without transmitters. The secondary detection system 1006 may receive reflecting signals from the detection signal sent by the primary detection system 1002, and may calculate an additional reference signal with respect to signals received from a different location and may provide the additional reference signal to the primary detection system 1002 for more accurate calculation about the location and distance of any object in both the detection zone 1004 and the detection zone 1008.

In another embodiment, secondary detection system 1006 may include an ultrasound or wireless transmitter and an ultrasound or wireless receiver, and may collaborate with the primary detection system 1002. For example, the primary detection system 1002 and the secondary detection system 1006 take turns to transmit detection signals or may transmit detection signals simultaneously. The additional signals transmitted from either the primary detection system 1002 or the secondary detection system 1006 may be received by primary detection system 1002 and secondary detection system 1006 as additional reference signals from different locations to provide more accurate calculation about the location and distance of any object in both the detection zone 1004 and the detection zone 1008. And primary detection system 1002 and the secondary detection system 1006 may then compare the detection results to determine whether an object is detected. FIG. 10B shows a combined detection of other vehicles in the blind spots of vehicle 102 by using a primary detection system on side mirror and a secondary detection system on rear side of the vehicle 102.

As previously explained, detection system 220 may include wireless transmitter 310 that can transmit both passive signals and active signals. FIG. 11 shows an exemplary configuration of detection system 220 using active wireless signals.

Figure 11A:
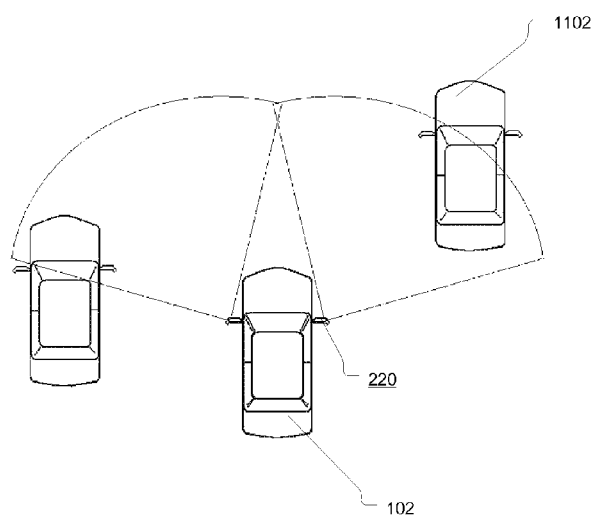
FIGS. 11A-11D illustrate exemplary configurations of a detection system consistent with the disclosed embodiments.

As shown in FIG. 11A, detection system 220 may be installed on vehicle 102 to transmit a wireless signal (e.g., infrared, radio etc.) as an active communication signal to another vehicle 1102 when vehicle 102 is in the blind spot of vehicle 1102. The wireless signal can then be received by a detection system (e.g., detection system 220) on the vehicle 1102. The detection system on the vehicle 1102 may then interpret the received signal according to a predetermined protocol and may alert the driver of vehicle 1102 of the vehicle 102 being in the blind spot.

Figure 11B:
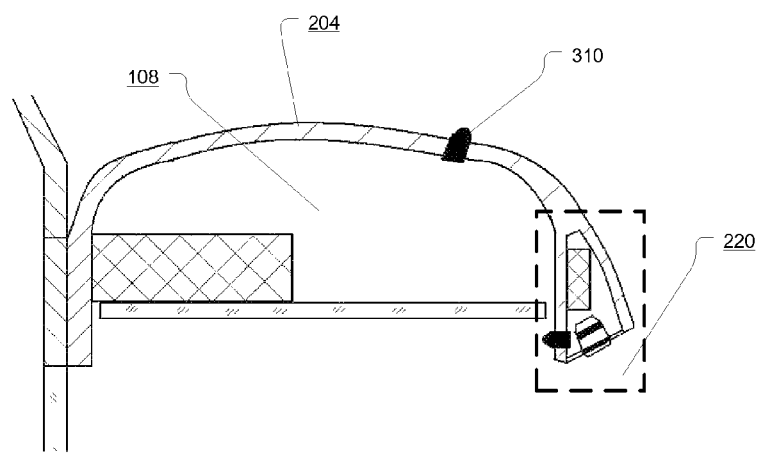

FIG. 11B shows another configuration of detection system 220 using active wireless signals. As shown in FIG. 11B, at least one wireless transmitter 310 may be separately placed on side mirror body 204 in a front-facing direction such that detection system 220 may transmit active signals using the wireless transmitter 310.

Figure 11C:
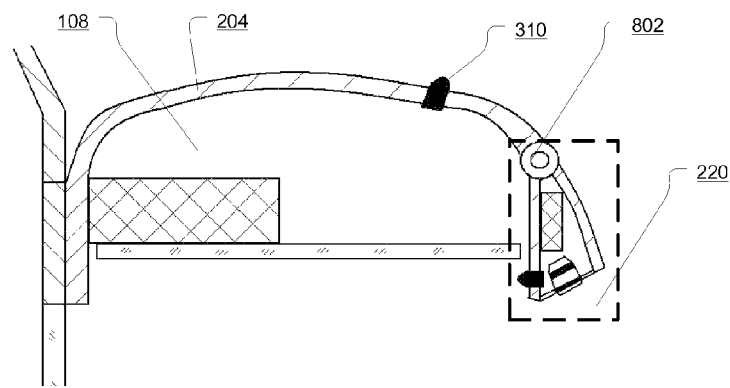

FIG. 11C shows another configuration of detection system 220 for using active signals. As shown in FIG. 11*c*, at least one wireless transmitter 310 may be separately placed on side mirror body 204 in a front-facing direction such that detection system 220, which is integrated with side mirror body 204 using rotating structure 802, may transmit active signals using the wireless transmitter 310.

Figure 11D:
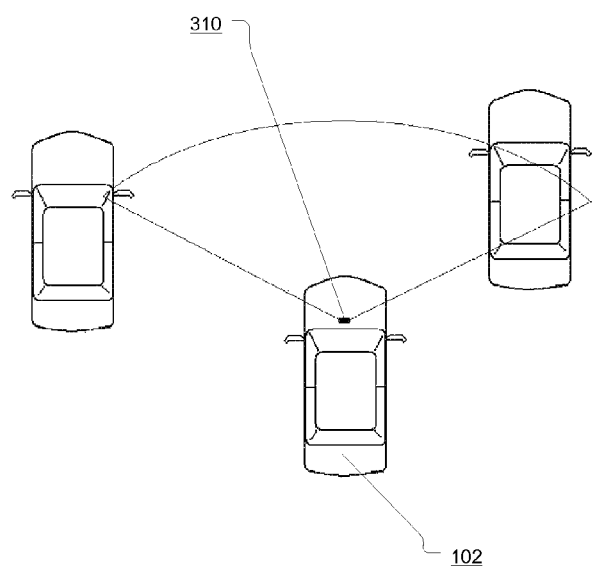

FIG. 11D shows another configuration of detection system 220 using active signals. As shown in FIG. 11D, at least one wireless transmitter 310 may be separately placed on other parts of the vehicle 102, such as at a center location of the front of vehicle 102. Other positions may also be used.

In practice, detection system 220 may use both active signals and passive signals. In other words, detection system 220 may include one or more separately-mounted front-facing wireless transmitter 310 as well as one or more rear-facing wireless transmitter 310 within detection system 220. Further, similar to wireless transmitter 310, one or more ultrasound transmitter 304 may also be placed separately in a front-facing or side-facing direction to increase accuracy, completeness, and flexibility of the detection system 220.

Figure 12A:
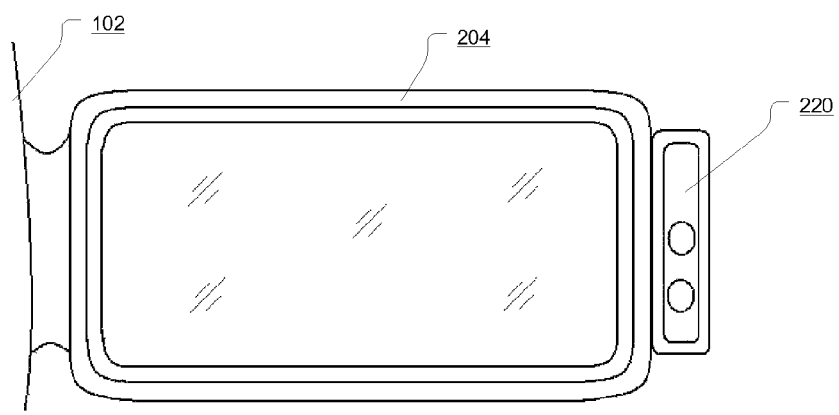
FIGS. 12A-12C illustrate exemplary arrangements of a detection system and a side mirror consistent with the disclosed embodiments.
Figure 12B:
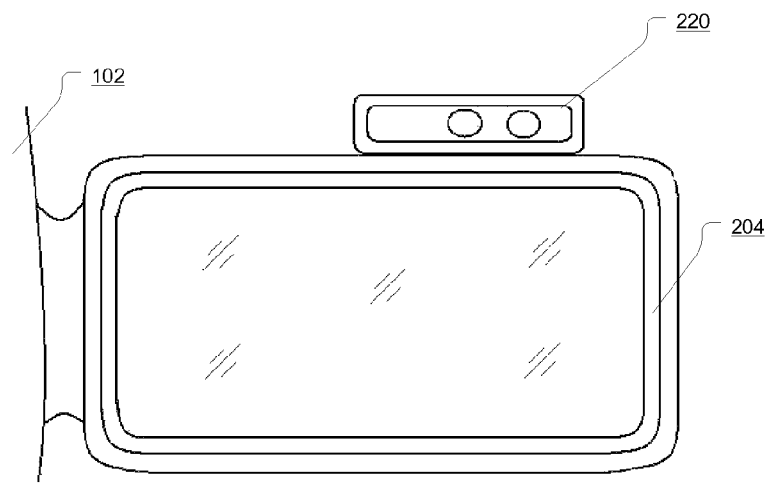
Figure 12C:
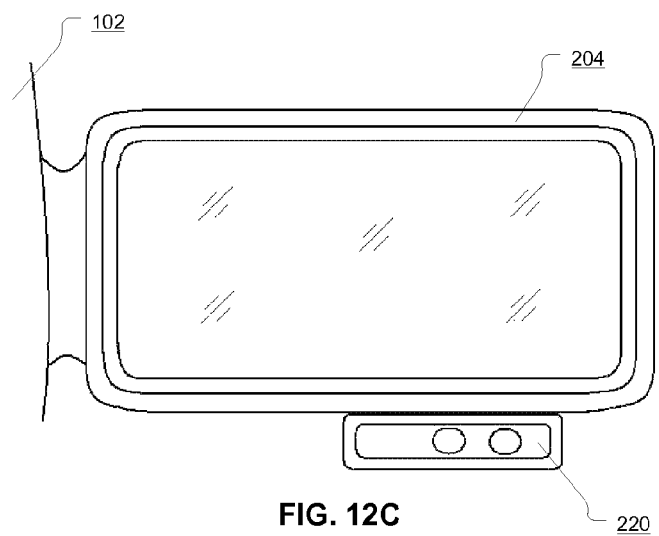

In the above disclosure, detection system 220 is either incorporated into side mirror body 204 or integrated with side mirror body 204. That is, detection system 220 becomes a part of side mirror body 204. However, detection system 220 may also be an add-on system or an independent system, with its own housing separately attached to certain parts of the vehicle. For example, as shown in FIG. 12A, detection system 220 is separately attached to the outer side of side mirror body 204 of vehicle 102. Or, as shown in FIG. 12B, detection system 220 is separately attached to the top side of side mirror body 204 of vehicle 102. Alternatively, as shown in FIG. 12C, detection system 220 is separately attached to the bottom side of side mirror body 204 of vehicle 102.

Figure 13A:
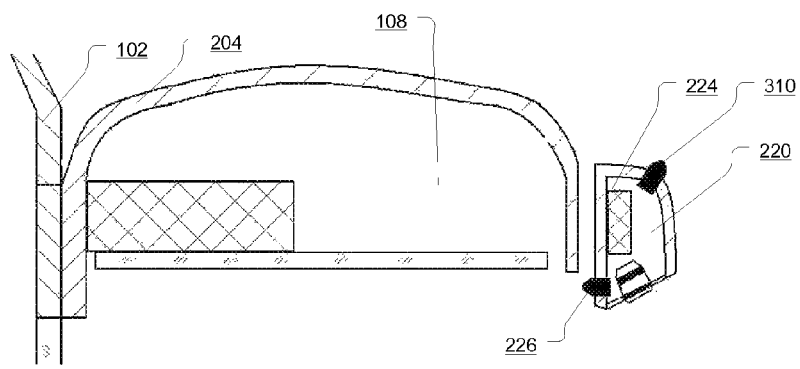
FIGS. 13A-13D illustrate exemplary arrangements of a detection system and a side mirror consistent with the disclosed embodiments.

FIGS. 13A-13D illustrates exemplary arrangements of detection system 220 and side mirror 108. As shown in FIG. 13A, all components of detection system 220, including control module or control circuitry 224, alert indicator 226, and wireless transmitter 310, etc., are within detection system 220, and detection system 220 is mounted on the outer side of side mirror body 204 of vehicle 102.

Figure 13B:
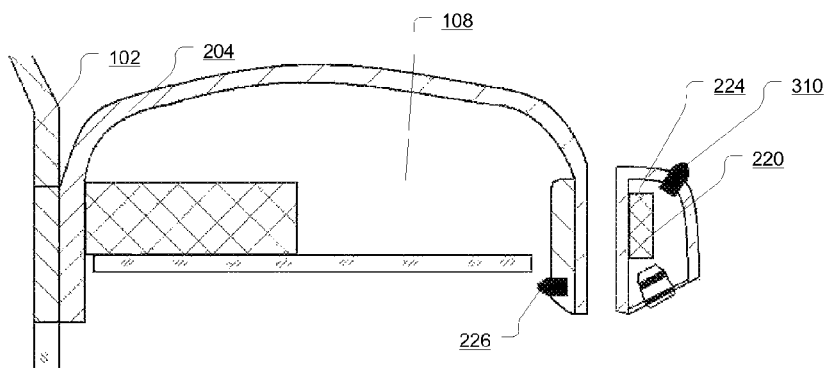

As shown in FIG. 13B, most components of detection system 220, including control circuitry 224 and wireless transmitter 310, etc., except alert indicator 226, are within detection system 220, and alert indicator 226 is mounted on the inner side of side mirror body 204. Further, similarly, detection system 220 is mounted on the outer side of side mirror body 204 of vehicle 102.

Figure 13C:
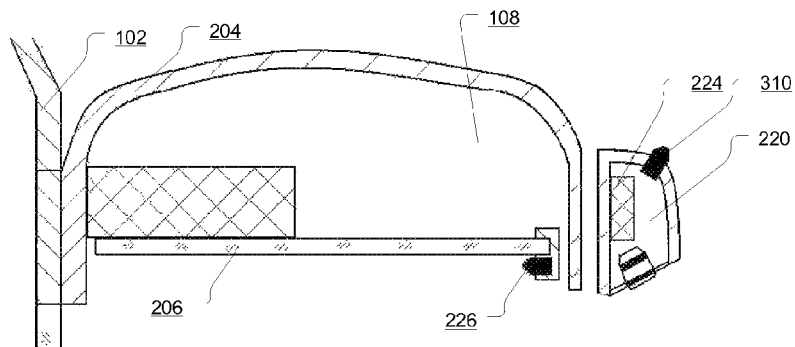

As shown in FIG. 13C, most components of detection system 220, including control circuitry 224 and wireless transmitter 310, etc., except alert indicator 226, are within detection system 220, and alert indicator 226 is mounted on the outer edge of mirror 206 of side mirror 108. Further, similarly, detection system 220 is mounted on the outer side of side mirror body 204 of vehicle 102.

Figure 13D:
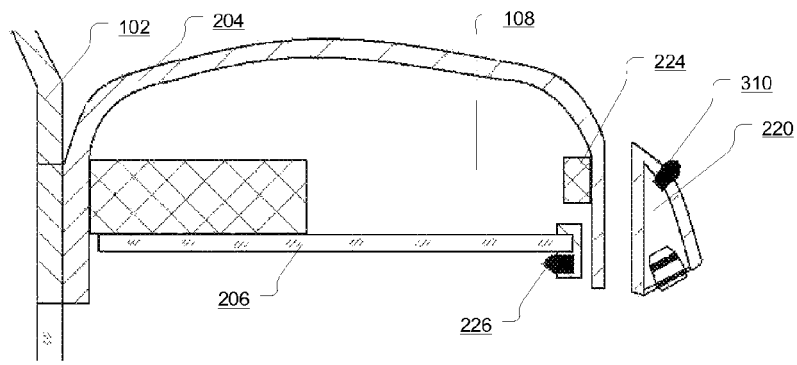

As shown in FIG. 13D, certain components of detection system 220, including wireless transmitter 310, etc., except control circuitry 224 and alert indicator 226, are within detection system 220. Control circuitry 224 is mounted on an inner side of side mirror body 204 and alert indicator 226 is mounted on the outer edge of mirror 206 of side mirror body 204. Further, similarly, detection system 220 is mounted on the outer side of side mirror body 204 of vehicle 102. Alternatively, only a portion of control circuitry 224 may be mounted on the inner side of side mirror body 204, while the remaining portion of control circuitry 224 may be within detection system 220.

Figure 14A:
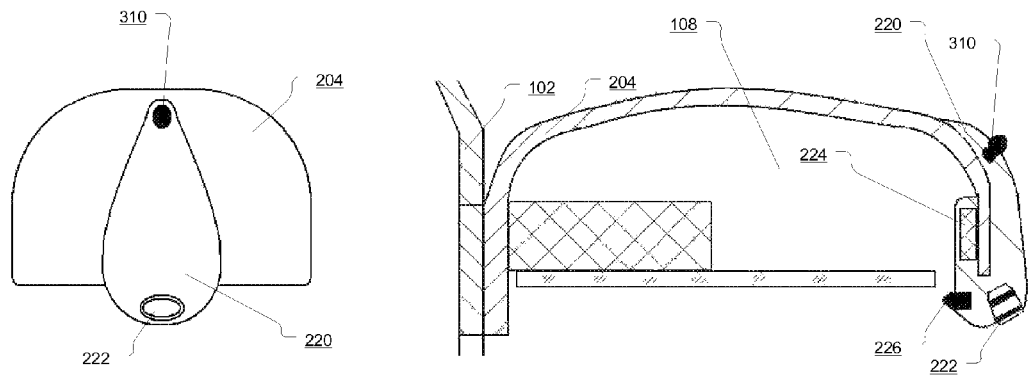
FIGS. 14A-14D illustrate exemplary arrangements of a detection system and a side mirror consistent with the disclosed embodiments.

Further, when attaching detection system 220 to side mirror body 204, various attaching structures and/or shapes may be used. For example, based on the dimension and shape of side mirror body 204, the shape of detection system 220 may be made into crown-shaped, prism-shaped, sphere-shaped, bar-shaped, block-shaped or other appropriate geometrically-shaped as so to be attached with side mirror body 204 seamlessly and with desired appearance and functionalities. FIG. 14A shows a side view and a cross-section view of a crown-shaped detection system 220 attached to side mirror body 204.

As shown in FIG. 14A, a crown-shaped detection system 220 is attached to side mirror 108 of vehicle 102 at the outer edge of the side mirror body 204. Within the crown-shaped detection system 220, wireless transmitter 310 is positioned close to the portion of detection system 220 connecting to side mirror body 204 and front-facing, detection module 222 is positioned at the lower end of the crown shape, and alert indicator 226 and control circuitry 224 are positioned at the inner side of outer wall of side mirror body 204.

Figure 14B:
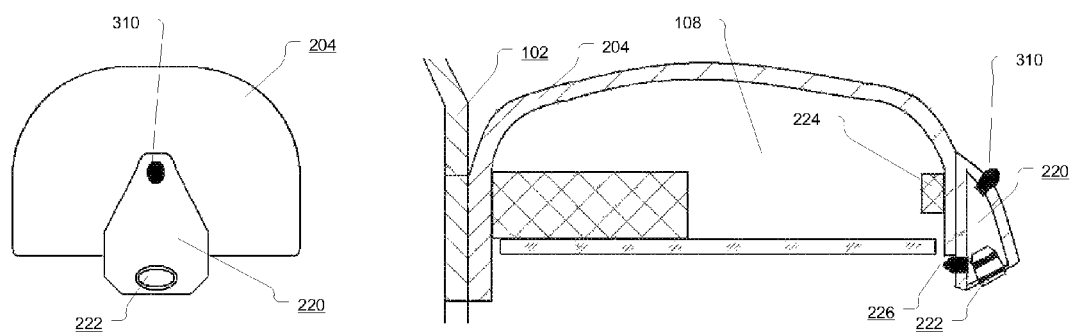

FIG. 14B shows a side view and a cross-section view of a prism-shaped detection system 220 attached to side mirror body 204. As shown in FIG. 14B, a prism-shaped detection system 220 is attached to side mirror 108 of vehicle 102 at the outer edge of the side mirror body 204. Within the prism-shaped detection system 220, wireless transmitter 310 is positioned close to the portion of detection system 220 connecting to side mirror body 204 and front-facing, detection module 222 is positioned at the lower end of the prism shape, and alert indicator 226 is positioned at the inner side of detection system 220 above the edge of side mirror body 204. Further, control circuitry 224 is positioned in the inner side wall of side mirror body 204.

Figure 14C:
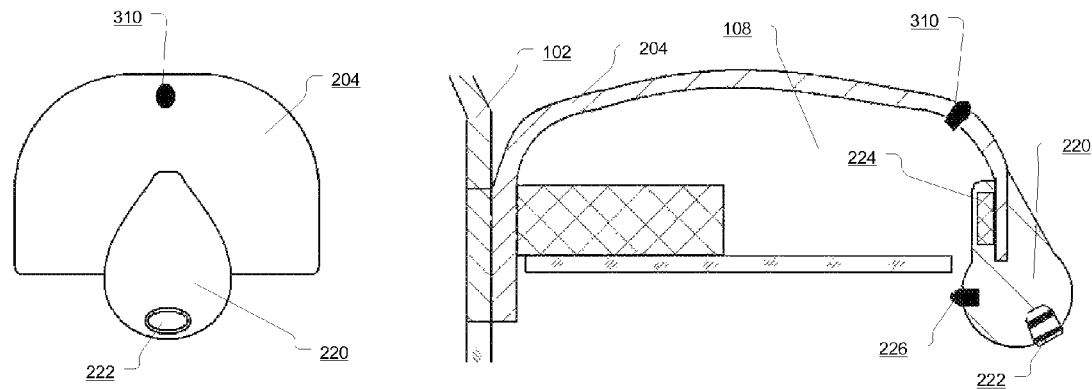

FIG. 14C shows a side view and a cross-section view of a sphere-shaped detection system 220 attached to side mirror body 204. As shown in FIG. 14C, a sphere-shaped detection system 220 is attached to side mirror 108 of vehicle 102 at the outer edge of the side mirror body 204. Within the sphere-shaped detection system 220, detection module 222 is positioned at the lower end of the sphere shape, and alert indicator 226 is positioned along a diameter direction of the sphere facing to the vehicle 102. Further, wireless transmitter 310 is positioned on side mirror body 204, front-facing and close to the outer edge of the side mirror body 204. Control circuitry 224 is positioned in the inner side wall of side mirror body 204.

Figure 14D:
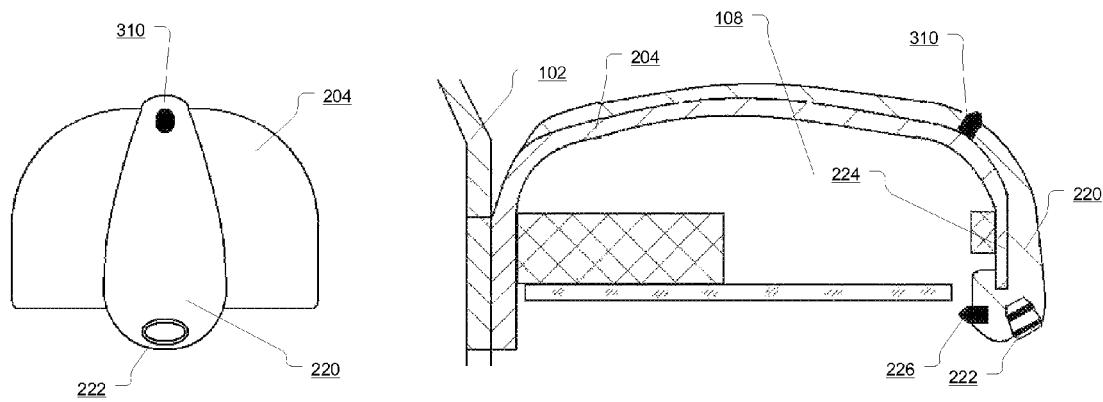

FIG. 14D shows a side view and a cross-section view of a bar-shaped detection system 220 attached to side mirror body 204. As shown in FIG. 14D, a bar-shaped detection system 220 is attached to side mirror 108 of vehicle 102 at the outer edge of the side mirror body 204. Within the bar-shaped detection system 220, wireless transmitter 310 is positioned on the bar shape and front-facing, detection module 222 is positioned at the lower end of the bar shape, and alert indicator 226 is positioned at the inner side of detection system 220 above the edge of side mirror body 204. Further, control circuitry 224 is positioned in the inner side wall of side mirror body 204. The bar-shaped detection system 220 may also circle around the front of side mirror body 204. Other shapes and configurations may also be used.

In addition, when detection system 220 becomes a part of side mirror body 204, other different arrangements or configurations may also be used. FIGS. 15A-15C illustrates exemplary arrangements of detection system 220 within side mirror body 204.

As shown in FIG. 15A, detection system 220 is placed in an upper part of side mirror body 204. The detection system 220 may be placed in a separate chamber independent from other mirror components, as shown in FIG. 15B, or in the same chamber as other mirror components, as shown in FIG. 15C.

FIGS. 16A-16C illustrates other exemplary arrangements of detection system 220 within side mirror body 204. As shown in FIG. 16A, detection system 220 is placed in a lower part of side mirror body 204. The detection system 220 may also be placed in a separate chamber independent from other mirror components, as shown in FIG. 16B, or in the same chamber as other mirror components, as shown in FIG. 16C.

FIGS. 17A-17B illustrates exemplary arrangements of detection system 220 within side mirror body 204. Similarly, detection system 220 can be placed in an outer side part of side mirror body 204, as shown in FIG. 17A, or in inner side part of side mirror body 204, as shown in FIG. 17B. Other arrangements may also be used.

By using the disclosed systems and methods, blind spot detection systems can be integrated with side mirrors of a vehicle or can be provided as separate systems. Thus, the blind spot detection systems can be installed during vehicle manufacturing process, or can be easily installed on existing vehicles by, for example, replacing the original side mirrors with new side mirrors having integrated blind spot detection systems. Or the separate blind spot detection systems can be easily later attached to the original side mirrors at various locations.

Further, the disclosed blind spot detection systems can achieve relatively-high detection sensitivity without high detection accuracy. Because the alert indicators are also located on side mirrors, the driver can be alarmed by even a false alert without any adverse consequence, as long as there is no missing alert. Therefore, it may be less expensive and complex to design and manufacture the blind spot detection systems than the conventional systems.

Other embodiments of the disclosure will be apparent to those skilled in the art from consideration of the specification and practice of the disclosure herein. It is intended that the specification and examples be considered as exemplary only, with the scope being indicated by the following claims.

What is claimed is:

1. A system for detecting a blind spot for a driver of a vehicle, comprising:
    a side mirror arranged on a body of the vehicle, wherein the side mirror includes a side mirror body having a mirror chamber for holding a mirror, and a supporting structure; and
    a detection system physically coupled with the side mirror to detect an object in a desired detection zone of the detection system, the desired detection zone covering the blind spot, wherein the detection system includes:
    a detection module is arranged at a first desired detection angle against a centerline of the vehicle via a pivot for generating the desired detection zone covering the blind spot, the detection module including at least one of a transmitter and a receiver; wherein the detection system is integrated with the side mirror body via the pivot; and
    an alert indicator configured to send an alert light to the driver at a predetermined angle such that the alert light does not interfere with drivers of other vehicles close to the vehicle,
    wherein:
    the detection system is integrated into the side mirror body, and forming part of an exterior of the side mirror body at a far-side with respect to the vehicle body of the side mirror body to form the mirror chamber, via the pivot such that the detection system is capable of rotating horizontally along the pivot;
    the alert indicator is placed on a part of the detection system also acting as an inner side of the side mirror body such that the alert indicator facing the driver of the vehicle at the predetermined angle; and
    the detection system has an inner chamber independently and separately from the mirror chamber for housing the detection module.

2. The system according to claim 1, wherein: the detection module is configured to have a second desired detection angle for transmitting detection signals such that the desired detection zone is defined by the first desired detection angle and the second desired detection angle.

3. The system according to claim 1, further comprising a secondary detection system placed at a different part of the vehicle and configured to transmit additional detection signals of the object in the desired detection zone as reference signals to be used by the detection system in addition to own detection signals.

4. The system according to claim 1, further comprising a secondary detection system placed at a different part of the vehicle and configured to receive detection signals sent by the detection system and to calculate a reference signal to be used by the detection system.

5. The system according to claim 1, further comprising a secondary detection system placed at a different part of the vehicle and having a secondary detection zone, wherein the detection system and the secondary detection system collaborate on detecting the object in a detection zone that combines the desired detection zone and the secondary detection zone.

6. The system according to claim 1, wherein:
the detection module includes an ultrasound transmitter and an ultrasound receiver; and
the detection system further includes a control module configured to control operation of the detection system to perform a detection process, the detection process comprising:
transmitting one or more ultrasound pulses;
determining whether any returning ultrasound pulse from the transmitted ultrasound pulses reflected back from the object in the detection zone is received;
when the returning ultrasound pulse is received, calculating a distance from the detection system to the object based on the returning ultrasound pulse;
determining whether the distance is within a predetermined threshold; and
when the distance is within the predetermined threshold, alerting the driver using the alert indicator.

7. The system according to claim 1, wherein: the detection system includes at least one infrared transmitter for transmitting detection signals and the infrared transmitter is positioned at a front-facing direction of the side mirror body.

8. The system according to claim 7, wherein:
the detection signals are active signals containing a message to another vehicle for notifying the another vehicle that the vehicle is in a blind spot of the another vehicle.

9. The system according to claim 7, wherein:
the infrared transmitter is placed on the front center of the vehicle.

10. The system according to claim 7, wherein: the infrared transmitter transmits into surrounding space of the vehicle infrared signals at a certain strength; and the infrared signals are intended to be received by other vehicles in the sounding space and to notify the other vehicles that the vehicle is in blind spots of the other vehicles.

11. The system according to claim 7, wherein:
the detection system includes an infrared detector mounted on a rear-view mirror to detect whether there are any infrared signals transmitted from other vehicles within the desired detection zone, wherein the desired detection zone covers the blind spot of the vehicle; and
when the infrared signals transmitted from other vehicles are detected, the detection system alerts the driver of the vehicle.

12. The system according to claim 7, wherein:
the detection signals include infrared signals, optical signals, and wireless signals.

13. The system according to claim 7, wherein: the detection system loads digital information about the vehicle, including orientation coordinates, speed, driving direction, and vehicle identification number, onto the detection signals to be transmitted into surrounding space of the vehicle and to be received by other vehicles in the surrounding space.

14. The system according to claim 1, wherein:
the detection system is crown-shaped; and
the detection module is positioned at a lower end of the crown shape.

15. The system according to claim 1, wherein:
the detection system is prism-shaped;
the detection module is positioned at a lower end of the prism shape; and
a control module of the detection system is configured to control operation of the detection system to perform a detection process and is positioned in an inner side wall of the side mirror body.

16. The system according to claim 1, wherein:
the detection system is sphere-shaped; and
the detection module is positioned at an lower end of the sphere shape.

* * * * *